United States Patent
Wu et al.

(10) Patent No.: US 12,048,670 B2
(45) Date of Patent: Jul. 30, 2024

(54) METHOD, APPARATUS, AND DEVICE FOR CONTROLLING MOXIBUSTION MANIPULATOR

(71) Applicant: Zhi Mei Kang Min (Zhuhai) Health Tech Co., Ltd., Guangdong (CN)

(72) Inventors: Chao Wu, Guangdong (CN); Yingfeng Tan, Guangdong (CN); Mengsi Ye, Guangdong (CN); Aizhen Li, Guangdong (CN)

(73) Assignee: ZHI MEI KANG MIN (ZHUHAI) HEALTH TECH CO., LTD., Guangdong (CN)

( * ) Notice: Subject to any disclaimer, the term of this patent is extended or adjusted under 35 U.S.C. 154(b) by 855 days.

(21) Appl. No.: 17/123,327

(22) Filed: Dec. 16, 2020

(65) Prior Publication Data
US 2022/0183928 A1   Jun. 16, 2022

(51) Int. Cl.
| | | |
|---|---|---|
| *A61H 39/06* | (2006.01) | |
| *A61H 39/02* | (2006.01) | |
| *B25J 9/16* | (2006.01) | |

(52) U.S. Cl.
CPC ............ *A61H 39/06* (2013.01); *A61H 39/02* (2013.01); *B25J 9/1656* (2013.01); *B25J 9/1679* (2013.01);
(Continued)

(58) Field of Classification Search
CPC ............ A61H 39/06; A61H 39/02; A61H 2201/0278; A61H 2201/5007;
(Continued)

(56) References Cited

U.S. PATENT DOCUMENTS

| | | | |
|---|---|---|---|
| 7,492,864 B2 * | 2/2009 | Peeters | A61B 6/4441 378/165 |
| 2022/0183928 A1 * | 6/2022 | Wu | B25J 9/1656 |

FOREIGN PATENT DOCUMENTS

| | | | |
|---|---|---|---|
| CN | 2083926 U | * | 9/1991 |
| CN | 204521567 U | * | 8/2015 |

(Continued)

OTHER PUBLICATIONS

CN-2083926-U translation (Year: 1991).*
(Continued)

*Primary Examiner* — Jason Holloway
(74) *Attorney, Agent, or Firm* — Gottlieb, Rackman & Reisman, PC (57) ABSTRACT

A method, apparatus, and device for controlling a moxibustion manipulator are disclosed. The method includes: acquiring acupuncture point position information; determining coordinate information of the moxibustion manipulator based on the acupuncture point position information and safe distance information, and controlling the moxibustion manipulator to move to a position corresponding to the coordinate information; acquiring coordinate information of a light spot, and determining a plane corresponding to the light spot based on the coordinate information of the light spot; determining rotation angle information of the moxibustion manipulator based on the plane corresponding to the light spot, the rotation angle information being used to adjust an angle of the manipulator relative to the plane corresponding to the light spot; and controlling, based on the rotation angle information, the moxibustion manipulator to adjust the angle.

17 Claims, 5 Drawing Sheets

(52) U.S. Cl.
CPC ............... *A61H 2201/0278* (2013.01); *A61H 2201/5007* (2013.01); *A61H 2201/5058* (2013.01)

(58) Field of Classification Search
CPC .... A61H 2201/5058; A61H 2201/5064; A61H 2201/5092; A61H 2201/5069; B25J 9/16; B25J 9/161; B25J 9/1656; B25J 9/1679
See application file for complete search history.

(56) References Cited

FOREIGN PATENT DOCUMENTS

| CN | 107080690 | | | 8/2017 | |
| --- | --- | --- | --- | --- | --- |
| CN | 107080690 | A | * | 8/2017 | |
| CN | 107174513 | A | * | 9/2017 | ............. A61H 39/00 |
| CN | 107648041 | | | 2/2018 | |
| CN | 108245416 | A | * | 7/2018 | ............. A61H 39/02 |
| CN | 108785064 | | | 11/2018 | |
| CN | 109431791 | | | 3/2019 | |
| CN | 109431796 | | | 3/2019 | |
| CN | 110037915 | | | 7/2019 | |
| CN | 111135070 | A | * | 5/2020 | |
| CN | 112315790 | A | * | 2/2021 | ............. A61H 39/06 |

OTHER PUBLICATIONS

CN-204521567-U translation (Year: 2015).*
CN-107080690-A translation (Year: 2017).*
CN-107174513-A translation (Year: 2017).*
CN-108245416-A translation (Year: 2018).*
CN-112315790-A translation (Year: 2019).*
Robot Controlled Acupuncture (Year: 2019).*
CN-111135070-A translation (Year: 2020).*
First Search for Chinese Patent Application No. 201910742371.X, The State Intellectual Property Office of People's Republic of China, Apr. 26, 2021.
First Office Action for Chinese Patent Application No. 201910742371.X, The State Intellectual Property Office of People's Republic of China, May 6, 2021.

* cited by examiner

3: Apparatus
310: Acquisition unit
320: First control unit
330: First determination unit
340: Second determination unit
350: Second control unit

Fig. 6

4: Device
400: Processor
410: Memory
420: Computer program

Fig. 7

METHOD, APPARATUS, AND DEVICE FOR CONTROLLING MOXIBUSTION MANIPULATOR

TECHNICAL FIELD

The present disclosure relates to the technical field of physiotherapy equipment, and in particular to a method, apparatus, and device for controlling a moxibustion manipulator.

BACKGROUND

With the improvement of people's living standard, the use of physiotherapy equipment is increasingly popular. At present, a moxibustion manipulator is an important part of the physiotherapy equipment. The moxibustion manipulator can replace the human to complete some more accurate operations and improve the efficiency of physiotherapy. Therefore, it is a major trend to carry out physiotherapy through moxibustion manipulators.

However, the domestic moxibustion manipulator technology is still in its infancy, physiotherapy process by a moxibustion manipulator still needs a lot of manual participation, and thus the overall efficiency is not high. In the process of using the moxibustion manipulator to give people moxibustion, it may also be difficult to control the moxibustion manipulator to accurately locate moxibustion acupuncture points.

Aimed at the problems of moxibustion manipulator control during physiotherapy, improved methods are proposed in the existing technology. One is to stick marks to moxibustion acupuncture points for positioning, which however affects a moxibustion effect and degrades user experience. Another is to drag the moxibustion manipulator to the moxibustion acupuncture points, and then return to the operation interface after each point-dragging, but the dragging operation is complicated and time-consuming, and it is difficult to accurately locate the moxibustion acupuncture points.

SUMMARY

Objectives of the present disclosure are to provide a method, apparatus, and device for controlling a moxibustion manipulator, so as to overcome the shortcomings and deficiencies in the existing technology.

In a first aspect according to some embodiments of the present disclosure, a method for controlling a moxibustion manipulator is provided, including:
  acquiring acupuncture point position information;
  based on the acupuncture point position information and safe distance information, determining coordinate information of the moxibustion manipulator, and controlling the moxibustion manipulator to move to a position corresponding to the coordinate information;
  acquiring coordinate information of a light spot, and determining a plane corresponding to the light spot based on the coordinate information of the light spot, wherein the light spot is formed by a light source inside the moxibustion manipulator irradiating on a human body, a central point of the light spot is an acupuncture point corresponding to the acupuncture point position information, and the light spot is provided in at least three;
  determining rotation angle information of the moxibustion manipulator based on the plane corresponding to the light spot, wherein the rotation angle information is used to adjust an angle of the manipulator relative to the plane corresponding to the light spot; and
  controlling, based on the rotation angle information, the moxibustion manipulator to adjust the angle.

In a second aspect according to some embodiments of the present disclosure, an apparatus for controlling a moxibustion manipulator is provided, including:
  an acquisition unit configured to acquire acupuncture point position information;
  a first control unit configured to determine coordinate information of the moxibustion manipulator based on the acupuncture point position information and safe distance information, and control the moxibustion manipulator to move to a position corresponding to the coordinate information;
  a first determination unit configured to acquire coordinate information of a light spot, and determine a plane corresponding to the light spot based on the coordinate information of the light spot, wherein the light spot is formed by a light source inside the moxibustion manipulator irradiating on a human body, a central point of the light spot is an acupuncture point corresponding to the acupuncture point position information, and the light spot is provided in at least three;
  a second determination unit configured to determine rotation angle information of the moxibustion manipulator based on the plane corresponding to the light spot, wherein the rotation angle information is used to adjust an angle of the manipulator relative to the plane corresponding to the light spot; and
  a second control unit configured to control, based on the rotation angle information, the moxibustion manipulator to adjust the angle.

In a third aspect according to some embodiments of the present disclosure, a device for controlling a moxibustion manipulator is provided, including a memory, a processor, and a computer program stored in the memory and runnable on the processor, wherein the computer program, when executed by the processor, causes the processor to perform the steps of the method for controlling the moxibustion manipulator as described in the first aspect.

In a fourth aspect of the embodiments of the present disclosure, provided is a computer-readable storage medium storing a computer program which, when executed by the processor, causes the processor to perform the steps of the method for controlling the moxibustion manipulator as described in the first aspect.

In the embodiments of the present disclosure, acupuncture point position information is acquired; based on the acupuncture point position information and safe distance information, coordinate information of the moxibustion manipulator is determined, and the moxibustion manipulator is controlled to move to a position corresponding to the coordinate information; coordinate information of a light spot is acquired, and a plane corresponding to the light spot is determined based on the coordinate information of the light spot, where the light spot is formed by a light source inside the moxibustion manipulator irradiating on a human body, a central point of the light spot is an acupuncture point corresponding to the acupuncture point position information, and the light spot is provided in at least three; rotation angle information of the moxibustion manipulator is determined based on the plane corresponding to the light spot, the rotation angle information being used to adjust an angle of the manipulator relative to the plane corresponding to the light spot; and based on the rotation angle information, the moxibustion manipulator is controlled to adjust the angle. According to the above scheme, coordinate information and rotation angle information of a moxibustion manipulator can be automatically acquired based on acupuncture point position information, which reduces the difficulty of adjusting the moxibustion manipulator during moxibustion, and improves the accuracy and speed of acupuncture point positioning.

BRIEF DESCRIPTION OF THE DRAWINGS

In order to describe the technical themes in the embodiments of the present disclosure more clearly, the accompanying drawings to be used in the embodiments or the existing technology will be briefly described below. Obviously, the drawings in the following description are only a part of embodiments of the present disclosure, and a person of ordinary skill in the art may also obtain other drawings based on these drawings without creative effort.

DETAILED DESCRIPTION

The technical themes in the embodiments of the present disclosure will be clearly and completely described as below with reference to the accompanying drawings in the embodiments of the present disclosure.

Before a detailed explanation to the embodiments of the present disclosure is made, some concepts involved in the present disclosure are described first.

Tool coordinate system of a moxibustion manipulator: The tool coordinate system is composed of a tool center point (TCP) and coordinate orientations. When moving, the tool center point (TCP) may move strictly according to a path and a speed specified by a program. A system-provided coordinate origin (i.e., the tool center point (TCP)) is in the center of a flange face of the sixth axis of the manipulator, and a vertical direction of the flange face of the sixth axis of the manipulator is the z-axis.

Motion modes of the moxibustion manipulator include (1) attitude motion and (2) linear motion.

(1) Attitude motion (i.e., relocation motion): a TCP position of the moxibustion manipulator is unchanged while the moxibustion manipulator rotates around a coordinate axis, and an attitude of the moxibustion manipulator is adjustable by changing a rotation angle.

(2) Linear motion: the attitude of the moxibustion manipulator is unchanged while its TCP linearly moves along the coordinate axis.

In a control logic based on Cartesian coordinates, if a six-axis moxibustion manipulator is enabled to accurately reaches a position, attitude motion information and linear motion information of the moxibustion manipulator need to be defined. The attitude motion information includes rx, ry, and rz, where rx represents a rotation angle of the moxibustion manipulator around the x-axis, ry represents a rotation angle of the moxibustion manipulator around the y-axis, and rz represents a rotation angle of the moxibustion manipulator around the z-axis. The linear motion information includes x, y, and z, where x represents a linear movement distance of the moxibustion manipulator along the x-axis, y represents a linear movement distance of the moxibustion manipulator along the y-axis, and z represents a linear movement distance of the moxibustion manipulator along the z-axis. Therefore, the six-axis moxibustion manipulator can be controlled to reach a designated position according to information (x, y, z, rx, ry, rz) of the moxibustion manipulator.

Figure 1:
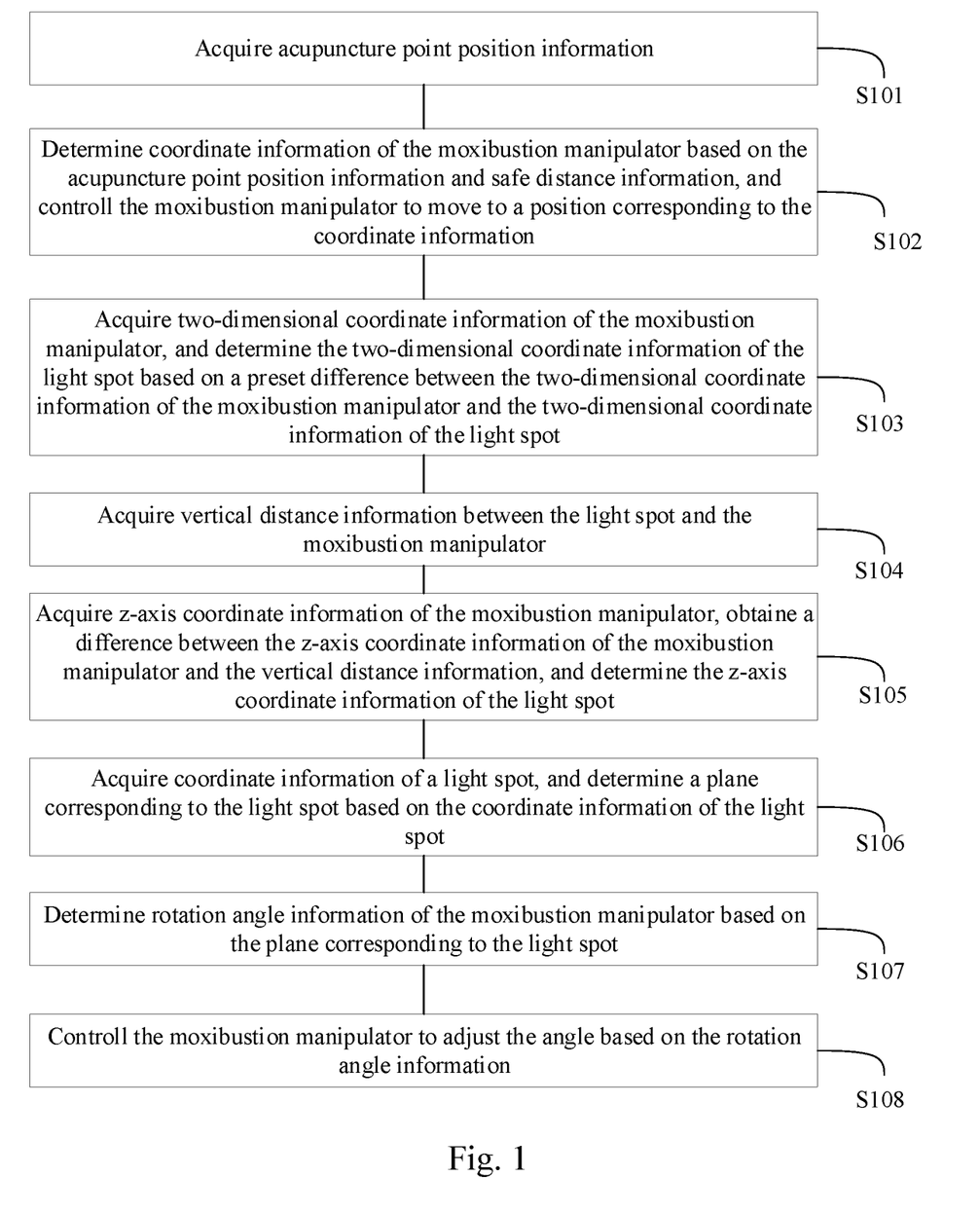
FIG. 1 is a schematic flowchart of a method for controlling a moxibustion manipulator according to an exemplary embodiment of the present disclosure.

Referring to FIG. 1, FIG. 1 is a schematic flowchart of a method for controlling a moxibustion manipulator according to an exemplary embodiment of the present disclosure. The method for controlling a moxibustion manipulator in this embodiment is performed by a moxibustion control device. The method for controlling a moxibustion manipulator as shown in FIG. 1 may include the following steps.

At S101, acupuncture point position information is acquired.

A moxibustion control device acquires acupuncture point position information. The acupuncture point position information is two-dimensional coordinate information of acupuncture points in a tool coordinate system of the moxibustion manipulator, i.e., x-axis coordinate information and y-axis coordinate information. A set of acupuncture point position information needs to be collected before the acupuncture point position information is acquired. During the execution of moxibustion, the control device acquires, according to an order of arrangement of acupuncture point position information in the set of acupuncture point position information collected, the acupuncture point position information sequentially. Operations of collecting a set of acupuncture point position information are as follows.

Figure 2:
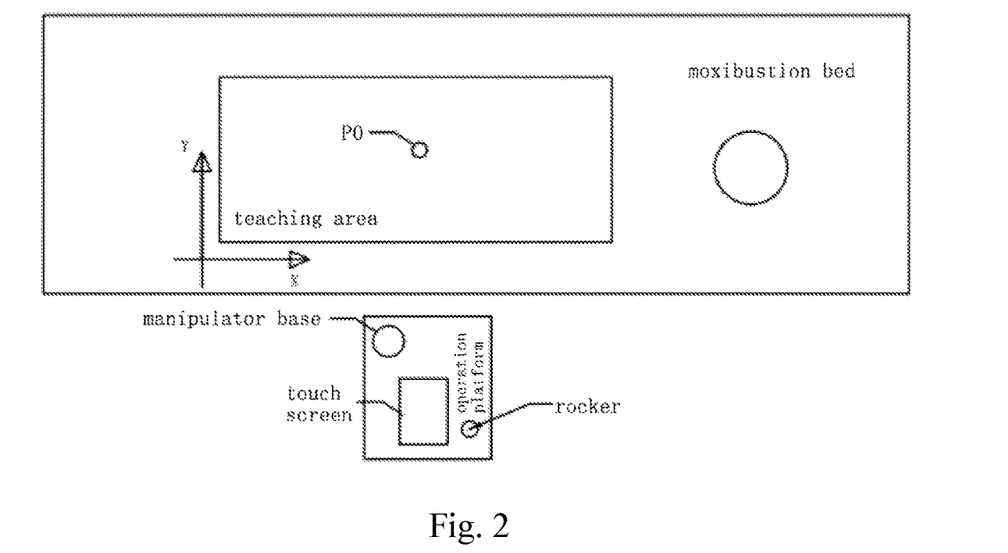
FIG. 2 is a top view of an operating range of a moxibustion manipulator according to an exemplary embodiment of the present disclosure.

As shown in FIG. 2, it is a top view of an operating range of a moxibustion manipulator according to an exemplary embodiment of the present disclosure. Before collection, firstly, a moxibustion subject lies on a moxibustion bed. A moxibustion practitioner clicks a "teaching mode" button on a touch screen, and the manipulator reaches above an initial point P0 with a fixed height in FIG. 2. The initial point P0 shown in the figure is only one of a plurality of initial points, and its specific position is not limited herein. A manipulator tool head is provided with at least three laser range sensors arranged in a circumference at an angle of 120 degrees and oriented vertically outwards with respect to a flange face of the sixth axis of the manipulator. In this embodiment, a manipulator tool head provided with three laser range sensors is selected. The laser range sensors may be any sensors with both a laser emission function and a ranging function, or the laser sensors may be replaced by ultrasonic sensors, each being added with a light source. During the collection, the moxibustion practitioner manually adjusts two-dimensional coordinates of the manipulator tool head by controlling a rocker. Since the laser range sensors can emit lasers oriented vertically on the skin of the moxibustion subject, three light spots may be formed on a skin surface of the moxibustion subject. The moxibustion practitioner may control the rocker to make to-be-collected acupuncture points locate in the middle of the three light spots. In this case, current two-dimensional coordinate information of the moxibustion manipulator is two-dimensional coordinate information of the to-be-collected acupuncture points. After acupuncture point position information of one to-be-collected acupuncture point is collected, the moxibustion practitioner continues to control the rocker to collect acupuncture point position information of other to-be-collected acupuncture points in the above manner to finally obtain a set of acupuncture point position information, and stores the set of acupuncture point position information in the control device. In addition, after collecting two-dimensional coordinate information of current acupuncture points, the moxibustion practitioner may further select techniques and execution time corresponding to the current acupuncture points on a control panel, and store the techniques and execution time corresponding to the current acupuncture points in the moxibustion control device.

At S102, coordinate information of the moxibustion manipulator is determined based on the acupuncture point position information and safe distance information, and the moxibustion manipulator is controlled to move to a position corresponding to the coordinate information.

The moxibustion control device determines coordinate information of the moxibustion manipulator based on the acupuncture point position information and safe distance information. The safe distance information is a distance value between the moxibustion manipulator and an acupuncture point corresponding to current acupuncture point position information. The safe distance information may be one of: (1) an optimal distance value between the moxibustion manipulator and the acupuncture point; (2) a minimum distance value from the moxibustion manipulator to the acupuncture point acceptable to the human body; and (3) a distance value set according to individual preferences of moxibustion subjects. The coordinate information of the moxibustion manipulator is linear motion information of the moxibustion manipulator, which may include x-axis coordinate information, y-axis coordinate information, and z-axis coordinate information, and may be expressed as (x, y, z). The moxibustion control device determines the x-axis coordinate information and the y-axis coordinate information of the moxibustion manipulator based on the acupuncture point position information, and determines the z-axis coordinate information of the moxibustion manipulator based on the safe distance information. In an embodiment, determination of the z-axis coordinate information may include measuring, by a ranging software, body thickness information of a moxibustion subject. The body thickness information may be an average thickness value throughout the whole body, or may be measured in real time according to a part of the body below the current acupuncture point. The body thickness information is input to the moxibustion control device. The moxibustion control device obtains the z-axis coordinate information of the moxibustion manipulator based on the body thickness information in combination with the safety distance information. The moxibustion control device determines the coordinate information (x, y, z), and controls the moxibustion manipulator to reach a position corresponding to the coordinate information (x, y, z).

Figure 3:
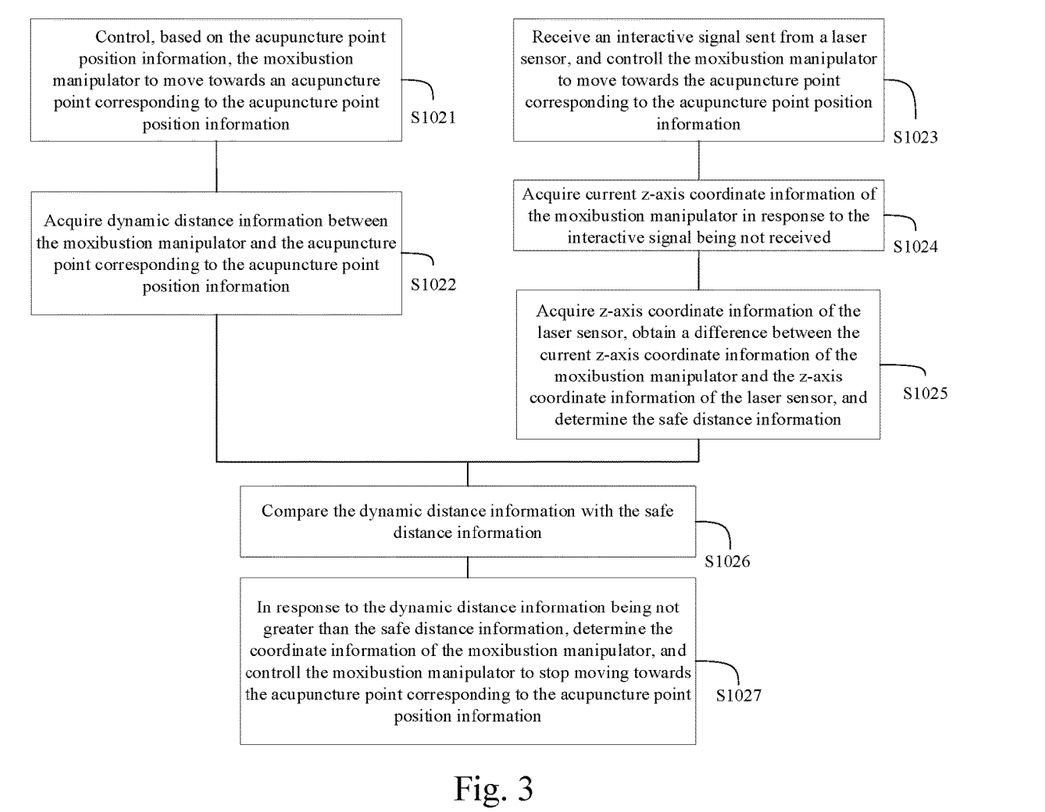
FIG. 3 is a schematic flowchart of S102 in a method for controlling a moxibustion manipulator according to an exemplary embodiment of the present disclosure.

In some embodiments, to determine the coordinate information of the moxibustion manipulator more accurately so as to improve the accuracy of positioning of the moxibustion manipulator, S102 may include S1021 to S1027. The order of S1021 to S1022 and S1023 to S1025 performed by the moxibustion control device is not limited here. S1021 to S1022 are performed to acquire dynamic distance information. S1023 to S1025 are performed to determine safe distance information. The moxibustion control device performs S1021 to S1025 and then performs S1026 to S1027. As shown in FIG. 3, S1021 to S1027 are described as follows.

At S1021, the moxibustion manipulator is controlled, based on the acupuncture point position information, to move towards an acupuncture point corresponding to the acupuncture point position information.

The moxibustion control device controls, based on the acupuncture point position information, the moxibustion manipulator to move towards an acupuncture point corresponding to the acupuncture point position information. The acupuncture point position information includes x-axis coordinate information and y-axis coordinate information of the acupuncture point, and x-axis coordinate information and y-axis coordinate information of the moxibustion manipulator are set to be the same as the x-axis coordinate information and the y-axis coordinate information of the acupuncture point, so as to control the moxibustion manipulator to linearly move along the x-axis and the y-axis to a position above the acupuncture point.

At S1022, dynamic distance information between the moxibustion manipulator and the acupuncture point corresponding to the acupuncture point position information is acquired.

The moxibustion control device acquires dynamic distance information between the moxibustion manipulator and the acupuncture point corresponding to the acupuncture point position information. The dynamic distance information may be distance information acquired by the moxibustion control device from any ranging instrument, which is not limited herein. In this embodiment, a laser range sensor is selected as the ranging instrument.

The laser range sensor is a precise range detection sensor. During operation, a laser diode emits laser pulses at a target first. After being reflected by the target, lasers diverge in all directions. Some scattered light goes back to a receiver, where it is received by an optical system in the receiver and imaged to an avalanche photodiode. The avalanche photodiode is an optical sensor with an internal amplification function, so it can detect extremely weak optical signals. Therefore, the laser range sensor can measure a target distance by recording and processing the time elapsed from emission of the laser pulse to reception of the returned laser pulse. Compared with other range sensors, the laser range sensor can provide more accurate detection results, and its application to this embodiment can further improve the accuracy and speed of measurement of the dynamic distance information.

The laser range sensor is arranged on the tool head of the moxibustion manipulator. When the moxibustion control device controls the moxibustion manipulator to move linearly along the z-axis, the laser range sensor measures the dynamic distance information between the moxibustion manipulator and the acupuncture point in real time.

At S1023, an interactive signal sent from a laser sensor is received, and the moxibustion manipulator is controlled to move towards the acupuncture point corresponding to the acupuncture point position information. The laser sensor is a pair of laser sensors which are horizontally opposed to each other, and movement of a moxibustion tool head of the moxibustion manipulator to a position between the laser sensors results in blockage of transmission of the interactive signal.

The moxibustion control device controls the moxibustion manipulator to determine safe distance information. In this embodiment, the safe distance information is a minimum allowable distance value between the moxibustion manipulator and the acupuncture point corresponding to the acupuncture point position information. A pair of laser sensors which are horizontally opposed to each other may be arranged on a base of the moxibustion manipulator to make a vertical distance between the laser sensors and the acupuncture point be a minimum allowable distance value between a moxa stick end and the acupuncture point. When a space for transmitting signals between the laser sensors is blocked, the laser sensors cannot receive each other's laser signals. In this case, the moxibustion control device cannot receive interactive signals sent from the laser sensors. The moxibustion control device receives interactive signals sent from the laser sensors while controlling the moxibustion manipulator to linearly move towards the acupuncture point along the z-axis, so as to confirm whether the moxa stick end moves with the moxibustion manipulator to the middle between the laser sensors, that is, confirm whether to continuously control the motion to the acupuncture point.

At S1024, current z-axis coordinate information of the moxibustion manipulator is acquired in response to the interactive signal being not received.

When the moxibustion control device cannot receive the interactive signal, the moxa stick end has moved with the moxibustion manipulator to the middle between the laser sensors, reaching the minimum distance between the moxa stick end and the acupuncture point. In this case, the motion of the manipulator is stopped, and current z-axis coordinate information of the moxibustion manipulator is acquired.

At S1025, z-axis coordinate information of the laser sensor is acquired, a difference between the current z-axis coordinate information of the moxibustion manipulator and the z-axis coordinate information of the laser sensor is obtained, and the safe distance information is determined.

The moxibustion control device acquires z-axis coordinate information of the laser sensors. When the minimum distance between the moxa stick end and the acupuncture point can be obtained by subtracting the z-axis coordinate information of the shooting laser sensors from the current z-axis coordinate information of the moxibustion manipulator, a current distance between the moxibustion manipulator and the moxibustion manipulator is a safe distance.

At S1026, the dynamic distance information is compared with the safe distance information. The safe distance information is a minimum distance value between the moxibustion manipulator and the acupuncture point corresponding to the acupuncture point position information.

The moxibustion control device compares the dynamic distance information with the safe distance information. In an embodiment, the moxibustion control device controls the moxibustion manipulator to detect downward and move from above the acupuncture point corresponding to the acupuncture point position information. As the moxibustion manipulator moves, the moxibustion control device acquires dynamic distance information from the laser range sensor in real time, and compares the dynamic distance information with the determined safe distance information. When the dynamic distance information is greater than the safe distance information, the moxibustion control device continuously controls the moxibustion manipulator to move towards the acupuncture point corresponding to the acupuncture point position information.

At S1027, in response to the dynamic distance information being not greater than the safe distance information, the coordinate information of the moxibustion manipulator is determined, and the moxibustion manipulator is controlled to stop moving towards the acupuncture point corresponding to the acupuncture point position information.

When the dynamic distance information is not greater than the safe distance information, the moxibustion control device determines the coordinate information (x, y, z) of the moxibustion manipulator, and controls the manipulator to stop moving.

In the following S103 to S105, coordinate information of a light spot is acquired. The coordinate information of the light spot includes two-dimensional coordinate information and z-axis coordinate information.

At S103, two-dimensional coordinate information of the moxibustion manipulator is acquired, and the two-dimensional coordinate information of the light spot is determined based on a preset difference between the two-dimensional coordinate information of the moxibustion manipulator and the two-dimensional coordinate information of the light spot.

The light spot is formed by a light source in the moxibustion manipulator irradiating on a human body. There is no restriction on the type of the light source herein, which in an embodiment is parallel light with strong anti-interference performance. In this embodiment, the light source is a laser emitted from the laser range sensor.

The moxibustion control device acquires two-dimensional coordinate information of the moxibustion manipulator, including x-axis coordinate information and y-axis coordinate information. The light spot is a light spot formed by a laser emitted from the laser range sensor irradiating on a human body, and in this embodiment, the laser range sensors are three laser range sensors mounted on the manipulator tool head, arranged in a circumference at an angle of 120 degrees, and oriented vertically outwards with respect to a flange face of the sixth axis of the manipulator. Therefore, two-dimensional coordinate information of the three laser range sensors can be obtained according to the two-dimensional coordinate information of the moxibustion manipulator and relative distances between the three laser range sensors and the moxibustion manipulator (i.e., the manipulator tool head), and the two-dimensional coordinate information of the laser range sensors is the coordinate information of the light spot.

At S104, vertical distance information between the light spot and the moxibustion manipulator is acquired.

The moxibustion control device acquires vertical distance information of the light spot measured by the laser range sensor and the moxibustion manipulator, that is, a difference between z-axis coordinate information of the moxibustion manipulator and z-axis coordinate information of the light spot.

At S105, z-axis coordinate information of the moxibustion manipulator is acquired, a difference between the z-axis coordinate information of the moxibustion manipulator and the vertical distance information is obtained, and the z-axis coordinate information of the light spot is determined.

The moxibustion control device acquires z-axis coordinate information of the moxibustion manipulator, and obtains the z-axis coordinate information of the light spot by subtracting the vertical distance information from the z-axis coordinate information of the moxibustion manipulator.

At S106, coordinate information of the light spot is acquired, and a plane corresponding to the light spot is determined based on the coordinate information of the light spot. The light spot is formed by a light source inside the moxibustion manipulator irradiating on a human body, a central point of the light spot is an acupuncture point corresponding to the acupuncture point position information, and the number of the light spot is at least three.

The moxibustion control device acquires coordinate information of the light spot, and determines a plane corresponding to the light spot based on the coordinate information of the light spot. There are three light spots in this embodiment. The coordinate information of the light spots may be expressed as (x, y, z). Specifically, the moxibustion control device acquires coordinate information of three light spots A, B, and C, which are $A(x_1, y_1, z_1)$, $B(x_2, y_2, z_2)$, and $C(x_3, y_3, z_3)$, respectively. It is assumed that a plane where the three light spots A, B, and C are located is $a(x-x_1)+b(y-y_1)+c(z-z_1)=0$, where parameters a, b, and c may be calculated according to the following formulas:

$$a=(y_2-y_1)*(z_3-z_1)-(y_3-y_1)*(z_2-z_1)$$

$$b=(z_2-z_1)*(x_3-x_1)-(z_3-z_1)*(x_2-x_1)$$

$$c=(x_2-x_1)*(y_3-y_1)-(x_3-x_1)*(y_2-y_1)$$

The coordinate information of three light spots A, B, and C are used by the moxibustion control device in the above formulas to calculate values of the parameters a, b, and c, so as to determine the plane $a(x-x_1)+b(y-y_1)+c(z-z_1)=0$ where the three light spots A, B, and C are located.

At S107, rotation angle information of the moxibustion manipulator is determined based on the plane corresponding to the light spot, the rotation angle information being used to adjust an angle of the manipulator relative to the plane corresponding to the light spot.

The moxibustion control device determines rotation angle information of the moxibustion manipulator based on the plane corresponding to the light spot. The moxibustion control device may determine a rotation angle by Euler angle, rotating vector, quaternion or other methods. In this embodiment, the rotation angle is calculated by Euler angle. The rotation angle information of the moxibustion manipulator is attitude motion information of the moxibustion manipulator, including: a rotation angle rx of the moxibustion manipulator around the x coordination axis, a rotation angle ry of the moxibustion manipulator around the y coordination axis, and a rotation angle rz of the moxibustion manipulator around the z coordination axis, which may be specifically expressed as (rx, ry, rz). The moxibustion control device adjusts the flange face of the sixth axis of the moxibustion manipulator based on the plane corresponding to the light spot to make the flange plane parallel to the plane corresponding to the light spot, so as to determine the rotation angle information (rx, ry, rz) of the moxibustion manipulator.

Figure 4:
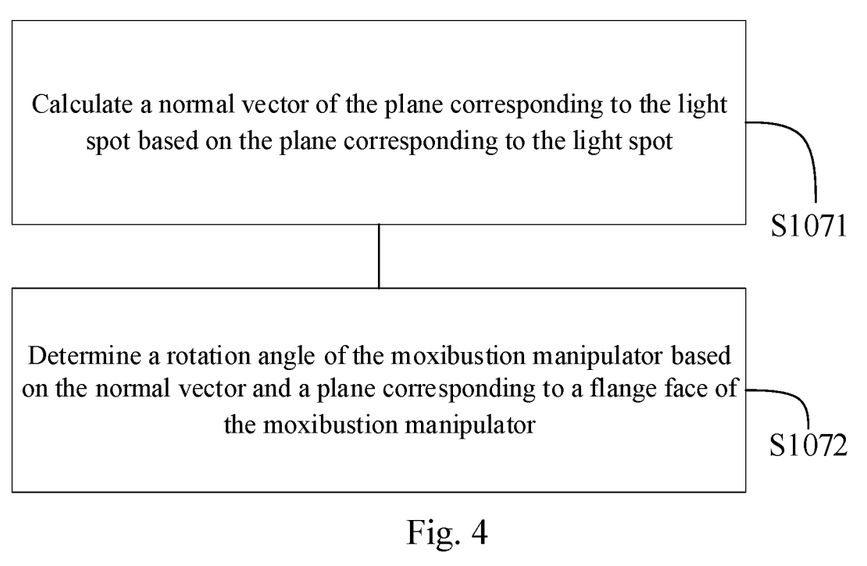
FIG. 4 is a schematic flowchart of S107 in the method for controlling the moxibustion manipulator according to an exemplary embodiment of the present disclosure.
Figure 5:
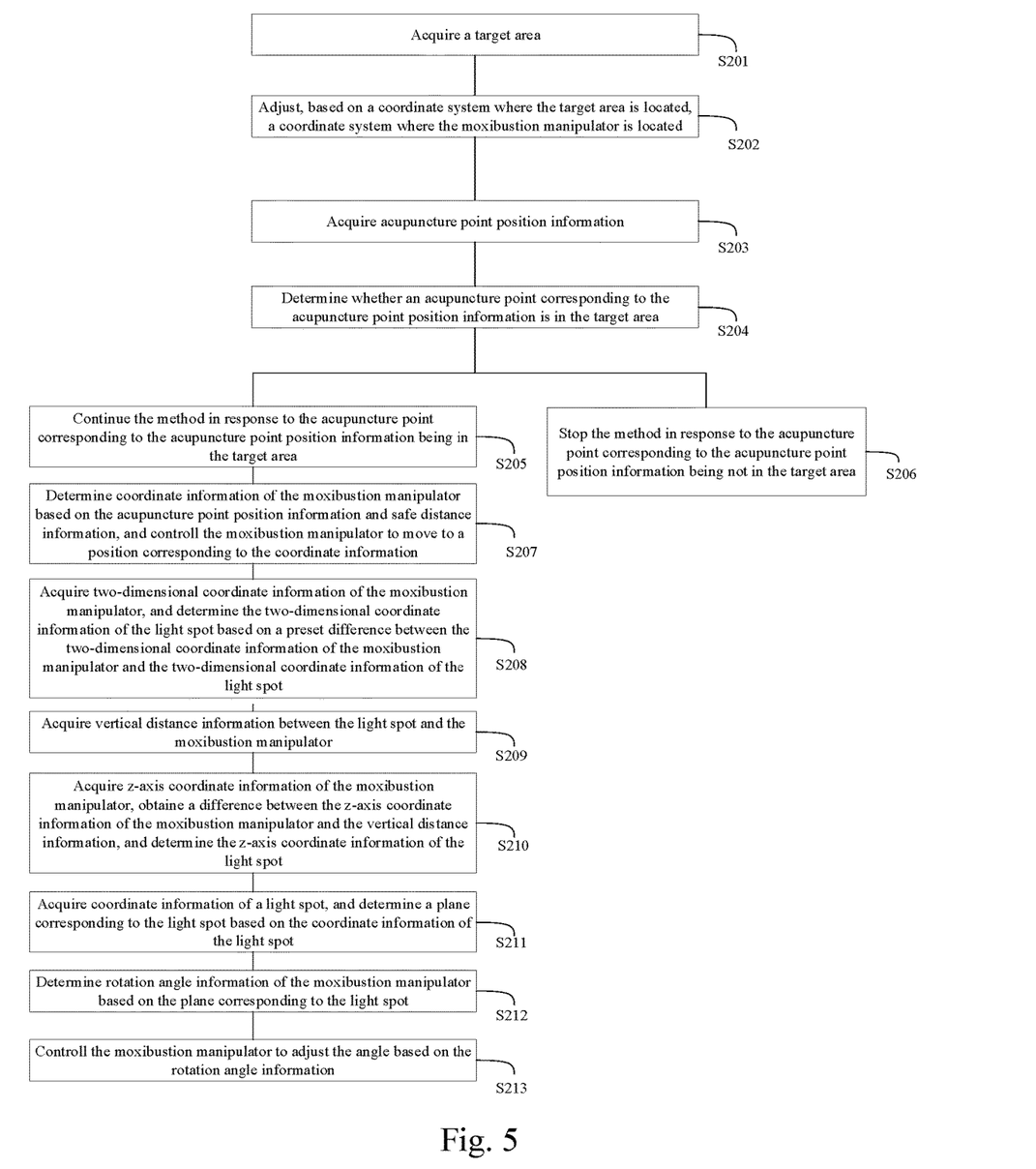
FIG. 5 is a schematic flowchart of a method for controlling a moxibustion manipulator according to another exemplary embodiment of the present disclosure.

To adjust attitude of the moxibustion manipulator more accurately so as to improve the accuracy of positioning of the moxibustion manipulator, S102 may include S1021 to S1027.

At S1071, a normal vector of the plane corresponding to the light spot is calculated based on the plane corresponding to the light spot.

The moxibustion control device calculates a normal vector corresponding to the plane based on the plane $a(x-x_1)+b(y-y_1)+c(z-z_1)=0$ corresponding to the light spots. The process for solving the normal vector is as follows.

Two vectors $\vec{AB}=(x_2-x_1, y_2-y_1, z_2-z_1)$ and $\vec{AC}=(x_3-x_1, y_3-y_1, z_3-z_1)$ in the plane are obtained based on the coordinates $A(x_1, y_1, z_1)$, $B(x_2, y_2, z_2)$, and $C(x_3, y_3, z_3)$ of the light spots, and are substituted into the following normal vector formula:

$$\vec{n}=\vec{AB}\times\vec{AC}=\begin{vmatrix} i & j & k \\ x_2-x_1 & y_2-y_1 & z_2-z_1 \\ x_3-x_1 & y_3-y_1 & z_3-z_1 \end{vmatrix}$$

Values of the vectors $\vec{AB}$ and $\vec{AC}$ are substituted into the normal vector formula to calculate the normal vector.

At S1072, a rotation angle of the moxibustion manipulator is determined based on the normal vector and a plane corresponding to a flange face of the moxibustion manipulator.

The moxibustion control device makes the flange face of the sixth axis of the moxibustion manipulator perpendicular to the normal vector based on the normal vector and a plane corresponding to a flange face of the moxibustion manipulator, so as to determine rotation angles (rx, ry, rz) of the moxibustion manipulator around the x-axis, the y-axis, and the z-axis respectively.

At S108, the moxibustion manipulator is controlled to adjust the angle based on the rotation angle information.

The moxibustion control device controls, based on the rotation angles (rx, ry, rz), the moxibustion manipulator to adjust the angles around the x-axis, the y-axis, and the z-axis respectively, thereby ensuring that the moxa stick end directly faces the acupuncture point of the human body.

Referring to FIG. 4 which is a schematic flowchart of a method for controlling a moxibustion manipulator according to another exemplary embodiment of the present disclosure. In this embodiment, the method for controlling a moxibustion manipulator is performed by a moxibustion control device. The method for controlling a moxibustion manipulator as shown in FIG. 4 includes S201 to S213. S203 is the same as S101, and S207 to S213 are the same as S102 to S108. The difference lies in that S201 to S202 are further included before S203 and S204 to S206 are further included after S203. S201 to S202 and S204 to S206 are described as follows.

At S201, a target area is acquired, the target area is a moxibustion execution area.

The moxibustion control device acquires a target area which is a moxibustion execution area. Moxibustion operations performed by the moxibustion manipulator on a human body needs to be performed in the target area.

At S202, a coordinate system where the moxibustion manipulator is located is adjusted based on a coordinate system where the target area is located.

The moxibustion control device adjusts, based on a coordinate system where the target area is located, a coordinate system where the moxibustion manipulator is located. The coordinate system where the target area is located may be set arbitrarily, for example, the origin of the coordinate system where the target area is located is the center of a mounting base of the moxibustion manipulator; the x-axis is horizontal to the right along a length direction of a moxibustion bed; the y-axis is vertical upward along a width direction of the moxibustion bed; the z-axis is perpendicular to a surface of the moxibustion bed. A coordinate system where the mounting base of the moxibustion manipulator is located is a base coordinate system of the manipulator. The moxibustion control device may adjust, through TCP setting inside the moxibustion manipulator, the coordinate system where the moxibustion manipulator is located, so as to make the coordinate system where the moxibustion manipulator is located consistent with the coordinate system where the target area is located.

In addition, during manual mounting of the manipulator, x-axis and y-axis directions of the rocker need to be unified with x-axis and y-axis directions of the target area, so as to acquire the acupuncture point position information more accurately.

At S204, whether an acupuncture point corresponding to the acupuncture point position information is in the target area is determined.

The moxibustion control device determines whether an acupuncture point corresponding to the acupuncture point position information is in the target area. The acupuncture point position information is two-dimensional coordinate information of the acupuncture point in the coordinate system of the moxibustion manipulator. After the moxibustion control device acquires the acupuncture point position information, it is needed to determine whether the acupuncture point corresponding to the acupuncture point position information falls within the target area. In an embodiment, a regional boundary of the target area may be calculated to determine which side of the boundary the acupuncture point corresponding to the acupuncture point position information is located, so as to confirm whether the acupuncture point is in the target area.

At S205, the method is continued in response to the acupuncture point corresponding to the acupuncture point position information being in the target area.

The moxibustion control device continues the subsequent steps S207 to S213 if it is confirmed that the acupuncture point corresponding to the acupuncture point position information is in the target area.

At S206, the method is stopped in response to the acupuncture point corresponding to the acupuncture point position information being not in the target area.

The moxibustion control device stops the method if it is confirmed that the acupuncture point corresponding to the acupuncture point position information is not in the target area, and sends an alarm signal, so as to ensure that moxibustion operations performed by the moxibustion manipulator on the human body are performed in the target area.

Figure 6:
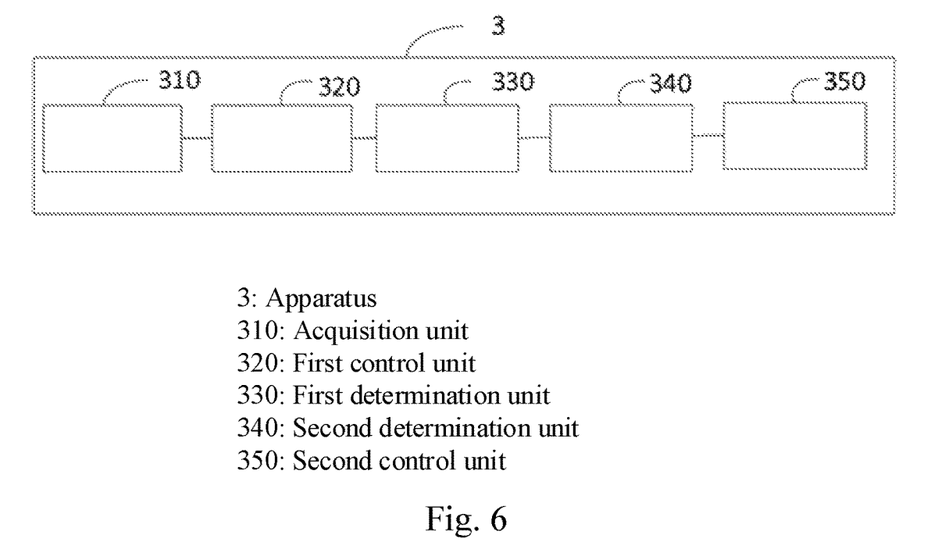
FIG. 6 is a schematic structural diagram of an apparatus for controlling a moxibustion manipulator according to an exemplary embodiment of the present disclosure.

Referring to FIG. 6 which is a schematic structural diagram of an apparatus for controlling a moxibustion manipulator according to an embodiment of the present disclosure. Various units included are configured to perform the steps in the embodiments corresponding to FIG. 1 and FIG. 3 to FIG. 5. For details, please refer to the related description in the embodiments corresponding to FIG. 1 and FIG. 3 to FIG. 5. For ease of description, only parts related to this embodiment are shown. Referring to FIG. 6, the apparatus 3 for controlling a moxibustion manipulator includes:

an acquisition unit 310 configured to acquire acupuncture point position information;

a first control unit 320 configured to determine coordinate information of the moxibustion manipulator based on the acupuncture point position information and safe distance information, and control the moxibustion manipulator to move to a position corresponding to the coordinate information;

a first determination unit 330 configured to acquire coordinate information of a light spot, and determine a plane corresponding to the light spot based on the coordinate information of the light spot, wherein the light spot is formed by a light source inside the moxibustion manipulator irradiating on a human body, a central point of the light spot is an acupuncture point corresponding to the acupuncture point position information, and the number of the light spot is at least three;

a second determination unit 340 configured to determine rotation angle information of the moxibustion manipulator based on the plane corresponding to the light spot, the rotation angle information being used to adjust an angle of the manipulator relative to the plane corresponding to the light spot; and a second control unit 350 configured to control, based on the rotation angle information, the moxibustion manipulator to adjust the angle.

Figure 7:
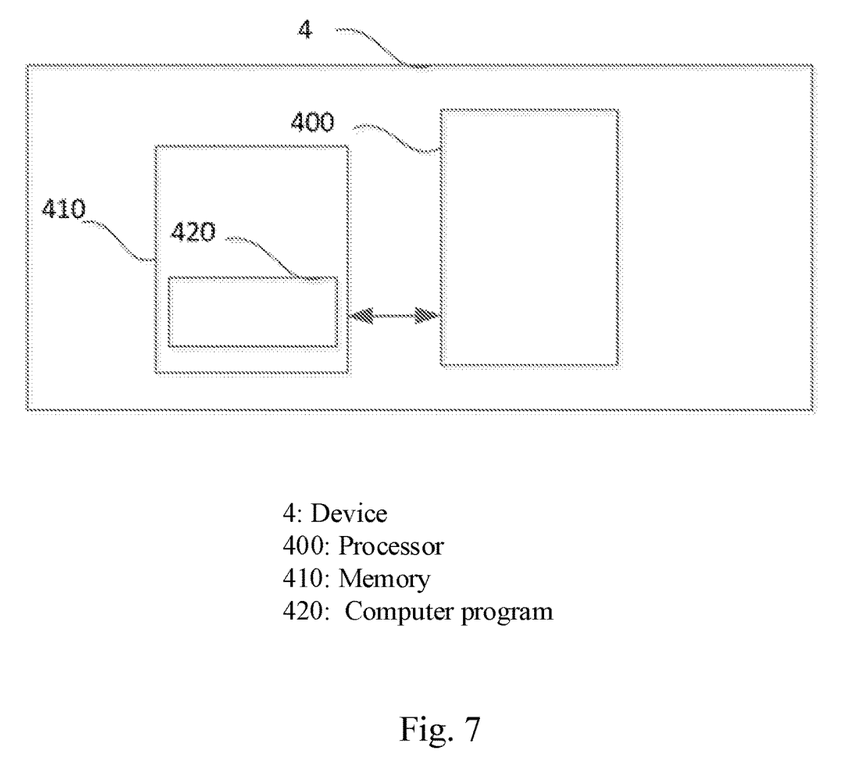
FIG. 7 is a schematic structural diagram of a device for controlling a moxibustion manipulator according to an exemplary embodiment of the present disclosure.

Referring to FIG. 7 which is a schematic diagram of a device for controlling a moxibustion manipulator according to an embodiment of the present disclosure. As shown in FIG. 7, the device 4 for controlling a moxibustion manipulator in this embodiment includes: a processor 400, a memory 410, and a computer program 420 stored in the memory 410 and runnable on the processor 400, for example, a program for controlling the moxibustion manipulator. The computer program 420, when executed by the processor 400, causes the processor 400 to perform the steps, for example, steps S101 to S108 shown in FIG. 1, in the embodiments of the method for controlling a moxibustion manipulator. Alternatively, functions of various modules/units, for example, the functions of the units 310 to 350 shown in the figure, are implemented when the processor 400 executes the computer program 420.

For example, the computer program 420 may be divided into one or more modules/units. The one or more modules/units are stored in the memory 410 and performed by the processor 400, to complete the present disclosure. The one or more modules/units may be a series of computer program instruction segments capable of performing a particular function. The instruction segments are used to describe an execution process of the computer program 420 in the device 4 for controlling a moxibustion manipulator. For example, the computer program 420 may be divided into an acquisition unit, a processing unit, an extraction unit, and a determination unit. Functions of various units are described as follows.

The acquisition unit is configured to acquire acupuncture point position information.

A first control unit is configured to determine coordinate information of the moxibustion manipulator based on the acupuncture point position information and safe distance information, and control the moxibustion manipulator to move to a position corresponding to the coordinate information;

A first determination unit is configured to acquire coordinate information of a light spot, and determine a plane corresponding to the light spot based on the coordinate information of the light spot. The light spot is formed by a light source inside the moxibustion manipulator irradiating on a human body, a central point of the light spot is an acupuncture point corresponding to the acupuncture point position information, and the number of the light spot is at least three.

A second determination unit is configured to determine rotation angle information of the moxibustion manipulator based on the plane corresponding to the light spot, the rotation angle information is used to adjust an angle of the manipulator relative to the plane corresponding to the light spot.

A second control unit is configured to control, based on the rotation angle information, the moxibustion manipulator to adjust the angle.

The device 4 for controlling a moxibustion manipulator may include, but is not limited to, a processor 400 and a memory 410. A person skilled in the art may understand that FIG. 4 is only an example of the device 4 for controlling a moxibustion manipulator and does not constitute a limitation on the device 4 for controlling a moxibustion manipulator, which may include more or fewer components than those illustrated, or combine some components, or use different components. For example, the device 4 for controlling a moxibustion manipulator may further include an input-output device, a network access device, a bus, and the like.

The processor 400 may be a Central Processing Unit (CPU), or other general-purpose processor, a Digital Signal Processor (DSP), an Application Specific Integrated Circuit (ASIC), a Field-Programmable Gate Array (FPGA) or another programmable logic device, discrete gate or transistor logic device, or discrete hardware component. The general-purpose processor may be a microprocessor, or the processor may be any conventional processor or the like.

The memory 410 may be an internal storage unit of the device 4 for controlling a moxibustion manipulator, for example, a hard disk or memory of the device 4 for controlling a moxibustion manipulator. The memory 410 may also be an external storage unit of the device 4 for controlling a moxibustion manipulator, for example, a plug-in hard disk, a Smart Media Card (SMC), a Secure Digital (SD) card, a Flash Card, or the like equipped on the device 4 for controlling a moxibustion manipulator. The memory 410 may further include both the internal storage unit and the external storage unit of the device 4 for controlling a moxibustion manipulator. The memory 410 is configured to store the computer program and other programs and data required by the device for controlling a moxibustion manipulator. The memory 410 may also be configured to temporarily store data that have been or will be output.

A person skilled in the art can clearly understand that, for convenience and simplicity of the description, only the above functional units and modules as divided are illustrated. In actual applications, the above functions can be assigned and completed by different functional units and modules according to requirements. That is, an internal structure of the apparatus may be divided into different functional units or modules to complete all or part of the functions described above. The functional units and modules in the embodiments may be integrated into one processing unit, or each of the units may exist alone physically, or two or more units may be integrated into one unit. The integrated unit may be implemented in the form of hardware, or may be implemented in the form of a software functional unit. In addition, specific names of various functional units and modules are only for the convenience of distinguishing over each other, and are not used to limit the protection scope of this application. Reference can be made to the corresponding process in the above method embodiments for the specific working procedures of the units and the modules in the system, which will not be repeated herein.

In the above embodiments, the description of each embodiment has its own focus; for the content that is not detailed or described in a certain embodiment, reference can be made to the relevant description of other embodiments.

A person of ordinary skill in the art should be aware of that units and algorithm steps of respective examples described in combination with the embodiments disclosed herein may be implemented by electronic hardware, computer software or a combination thereof. Whether the functions are executed by hardware or software depends on specific applications and design constraints of the technical theme. Professionals may implement the described functions by using different methods for each specific application, but such implementation should not be considered to go beyond the scope of the present disclosure.

In the embodiments provided in the present disclosure, it is to be understood that the disclosed apparatus/terminal device and method may be implemented in another manner. For example, the described apparatus/terminal device embodiments are only exemplary. For example, division of the modules or units is merely based on logical functions and division in another manner may exist in actual implementation. For example, a plurality of units or components may be combined or integrated into another system, or some features may be ignored or not performed. In addition, the mutual coupling or direct coupling or communication shown or discussed may be implemented by using some interfaces, and the indirect coupling or communication between the apparatuses or units may be implemented electrically, mechanically, or the like.

The units described as separate parts may or may not be physically separate, and parts shown as units may or may not be physical units, may be located in one position, or may be distributed over a plurality of network units. Some or all of the units may be selected according to actual needs to achieve the objectives of the themes of the embodiments.

In addition, functional units in the embodiments of the present disclosure may be integrated into one processing unit, or each of the units may exist alone physically, or two or more units are integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such understanding, all or part of the flow in the method according to the embodiments of the present disclosure may also be implemented by a program instructing relevant hardware. The computer program may be stored in a computer-readable storage medium. When the computer program is executed by a processor, the steps in the method embodiments can be implemented. The computer program includes computer program code, which may be in the form of source code, in the form of object code, executable files, or some intermediate forms. The computer-readable medium may include: any entity or apparatus capable of carrying the computer program code, a recording medium, a USB flash disk, a removable hard disk, a magnetic disk, an optical disk, a computer memory, a Read-Only Memory (ROM), a Random Access Memory (RAM), electrical carrier signals, telecommunications signals, a software distribution medium, and the like. It is to be noted that the contents included in the computer-readable medium may be increased or decreased as appropriate in accordance with the requirements of legislation and patent practice in the jurisdiction. For example, in some jurisdictions, the computer-readable medium does not include electrical carrier signals and telecommunications signals according to legislation and patent practice. The present disclosure is not limited to the above embodiments. If various alterations or transformations to the present disclosure do not depart from the principle and scope of the present disclosure, the present disclosure is also intended to include such alterations and transformations provided that such alterations and transformations fall within the scope of the claims and equivalent technologies of the present disclosure.

What is claimed is:

1. A method for controlling a moxibustion manipulator, comprising:
   acquiring acupuncture point position information;
   determining coordinate information of the moxibustion manipulator based on the acupuncture point position information and safe distance information, and controlling the moxibustion manipulator to move to a position corresponding to the coordinate information;
   acquiring coordinate information of a light spot, and determining a plane corresponding to the light spot based on the coordinate information of the light spot, wherein the light spot is formed by a light source inside the moxibustion manipulator irradiating on a human body, a central point of the light spot is an acupuncture point corresponding to the acupuncture point position information, and the light spot is provided in at least three;
   determining rotation angle information of the moxibustion manipulator based on the plane corresponding to the light spot, wherein the rotation angle information is used to adjust an angle of the manipulator relative to the plane corresponding to the light spot; and
   controlling, based on the rotation angle information, the moxibustion manipulator to adjust the angle;
   wherein the step of determining rotation angle information of the moxibustion manipulator based on the plane corresponding to the light spot comprises:
   calculating a normal vector of the plane corresponding to the light spot based on the plane corresponding to the light spot; and
   determining a rotation angle of the moxibustion manipulator based on the normal vector and a plane corresponding to a flange face of the moxibustion manipulator.

2. The method for controlling a moxibustion manipulator of claim 1, wherein the step of determining coordinate information of the moxibustion manipulator based on the acupuncture point position information and safe distance information, and controlling the moxibustion manipulator to move to a position corresponding to the coordinate information comprises:
   controlling, based on the acupuncture point position information, the moxibustion manipulator to move towards an acupuncture point corresponding to the acupuncture point position information;
   acquiring dynamic distance information between the moxibustion manipulator and the acupuncture point corresponding to the acupuncture point position information;
   comparing the dynamic distance information with the safe distance information, wherein the safe distance information is a minimum distance value between the moxibustion manipulator and the acupuncture point corresponding to the acupuncture point position information; and
   in response to the dynamic distance information being not greater than the safe distance information, determining the coordinate information of the moxibustion manipulator, and controlling the moxibustion manipulator to stop moving towards the acupuncture point corresponding to the acupuncture point position information.

3. The method for controlling a moxibustion manipulator of claim 2, further comprising, before comparing the dynamic distance information with the safe distance information:
   receiving an interactive signal sent from a laser sensor, and controlling the moxibustion manipulator to move towards the acupuncture point corresponding to the acupuncture point position information, wherein the laser sensor comprises a pair of laser sensors which are horizontally opposed to each other, and movement of a moxibustion tool head of the moxibustion manipulator to a position between the laser sensors results in blockage of transmission of the interactive signal;
   acquiring current z-axis coordinate information of the moxibustion manipulator in response to the interactive signal being not received; and
   acquiring z-axis coordinate information of the laser sensor, obtaining a difference between the current z-axis coordinate information of the moxibustion manipulator and the z-axis coordinate information of the laser sensor, and determining the safe distance information.

4. The method for controlling a moxibustion manipulator of claim 1, wherein the coordinate information of the light spot comprises two-dimensional coordinate information and z-axis coordinate information, and the method further comprises:
   before the step of acquiring coordinate information of a light spot, and determining a plane corresponding to the light spot based on the coordinate information of the light spot,
   acquiring two-dimensional coordinate information of the moxibustion manipulator, and determining the two-dimensional coordinate information of the light spot based on a preset difference between the two-dimensional coordinate information of the moxibustion manipulator and the two-dimensional coordinate information of the light spot;
   acquiring vertical distance information between the light spot and the moxibustion manipulator; and
   acquiring z-axis coordinate information of the moxibustion manipulator, obtaining a difference between the z-axis coordinate information of the moxibustion manipulator and the vertical distance information, and determining the z-axis coordinate information of the light spot.

5. The method for controlling a moxibustion manipulator of claim 1, further comprising:
   before acquiring acupuncture point position information, acquiring a target area, wherein the target area is a moxibustion execution area; and
   adjusting, based on a coordinate system where the target area is located, a coordinate system where the moxibustion manipulator is located.

6. The method for controlling a moxibustion manipulator of claim 5, further comprising:
   after acquiring acupuncture point position information,
   determining whether an acupuncture point corresponding to the acupuncture point position information is in the target area;
   continuing the method in response to the acupuncture point corresponding to the acupuncture point position information being in the target area; and
   stopping the method in response to the acupuncture point corresponding to the acupuncture point position information being not in the target area.

7. A device for controlling a moxibustion manipulator, comprising a memory, a processor, and a computer program stored in the memory and runnable on the processor, wherein the computer program, when executed by the processor, causes the processor to perform steps of:
   acquiring acupuncture point position information;
   determining coordinate information of the moxibustion manipulator based on the acupuncture point position information and safe distance information, and controlling the moxibustion manipulator to move to a position corresponding to the coordinate information;
   acquiring coordinate information of a light spot, and determining a plane corresponding to the light spot based on the coordinate information of the light spot, wherein the light spot is formed by a light source inside the moxibustion manipulator irradiating on a human body, a central point of the light spot is an acupuncture point corresponding to the acupuncture point position information, and the light spot is provided in at least three;
   determining rotation angle information of the moxibustion manipulator based on the plane corresponding to the light spot, wherein the rotation angle information is used to adjust an angle of the manipulator relative to the plane corresponding to the light spot; and
   controlling, based on the rotation angle information, the moxibustion manipulator to adjust the angle;
   wherein the step of determining rotation angle information of the moxibustion manipulator based on the plane corresponding to the light spot comprises:
   calculating a normal vector of the plane corresponding to the light spot based on the plane corresponding to the light spot; and
   determining a rotation angle of the moxibustion manipulator based on the normal vector and a plane corresponding to a flange face of the moxibustion manipulator.

8. The device for controlling a moxibustion manipulator of claim 7, wherein the step of determining coordinate information of the moxibustion manipulator based on the acupuncture point position information and safe distance information, and controlling the moxibustion manipulator to move to a position corresponding to the coordinate information comprises:
   controlling, based on the acupuncture point position information, the moxibustion manipulator to move towards an acupuncture point corresponding to the acupuncture point position information;
   acquiring dynamic distance information between the moxibustion manipulator and the acupuncture point corresponding to the acupuncture point position information;
   comparing the dynamic distance information with the safe distance information, wherein the safe distance information is a minimum distance value between the moxibustion manipulator and the acupuncture point corresponding to the acupuncture point position information; and
   in response to the dynamic distance information being not greater than the safe distance information, determining the coordinate information of the moxibustion manipulator, and controlling the moxibustion manipulator to stop moving towards the acupuncture point corresponding to the acupuncture point position information.

9. The device for controlling a moxibustion manipulator of claim 8, wherein the computer program, when executed by the processor, causes the processor to perform steps of: before comparing the dynamic distance information with the safe distance information,
   receiving an interactive signal sent from a laser sensor, and controlling the moxibustion manipulator to move towards the acupuncture point corresponding to the acupuncture point position information, wherein the laser sensor comprises a pair of laser sensors which are horizontally opposed to each other, and movement of a moxibustion tool head of the moxibustion manipulator to a position between the laser sensors results in blockage of transmission of the interactive signal;
   acquiring current z-axis coordinate information of the moxibustion manipulator in response to the interactive signal being not received; and
   acquiring z-axis coordinate information of the laser sensor, obtaining a difference between the current z-axis coordinate information of the moxibustion manipulator and the z-axis coordinate information of the laser sensor, and determining the safe distance information.

10. The device for controlling a moxibustion manipulator of claim 7, wherein the coordinate information of the light spot comprises two-dimensional coordinate information and z-axis coordinate information, and the computer program, when executed by the processor, causes the processor to perform steps of:
    before the step of acquiring coordinate information of a light spot, and determining a plane corresponding to the light spot based on the coordinate information of the light spot,
    acquiring two-dimensional coordinate information of the moxibustion manipulator, and determining the two-dimensional coordinate information of the light spot based on a preset difference between the two-dimensional coordinate information of the moxibustion manipulator and the two-dimensional coordinate information of the light spot;
    acquiring vertical distance information between the light spot and the moxibustion manipulator; and
    acquiring z-axis coordinate information of the moxibustion manipulator, obtaining a difference between the z-axis coordinate information of the moxibustion manipulator and the vertical distance information, and determining the z-axis coordinate information of the light spot.

11. The device for controlling a moxibustion manipulator of claim 7, wherein the computer program, when executed by the processor, causes the processor to perform steps of:
    before acquiring acupuncture point position information,
    acquiring a target area, wherein the target area is a moxibustion execution area; and
    adjusting, based on a coordinate system where the target area is located, a coordinate system where the moxibustion manipulator is located.

12. The device for controlling a moxibustion manipulator of claim 11, wherein the computer program, when executed by the processor, causes the processor to perform steps of:
    after acquiring acupuncture point position information,
    determining whether an acupuncture point corresponding to the acupuncture point position information is in the target area;
    continuing the method in response to the acupuncture point corresponding to the acupuncture point position information being in the target area; and
    stopping the method in response to the acupuncture point corresponding to the acupuncture point position information being not in the target area.

13. A non-transitory computer-readable storage medium storing a computer program which, when executed by the processor, causes the processor to perform steps of:
acquiring acupuncture point position information;
determining coordinate information of the moxibustion manipulator based on the acupuncture point position information and safe distance information, and controlling the moxibustion manipulator to move to a position corresponding to the coordinate information;
acquiring coordinate information of a light spot, and determining a plane corresponding to the light spot based on the coordinate information of the light spot, wherein the light spot is formed by a light source inside the moxibustion manipulator irradiating on a human body, a central point of the light spot is an acupuncture point corresponding to the acupuncture point position information, and the light spot is provided in at least three;
determining rotation angle information of the moxibustion manipulator based on the plane corresponding to the light spot, wherein the rotation angle information is used to adjust an angle of the manipulator relative to the plane corresponding to the light spot; and
controlling, based on the rotation angle information, the moxibustion manipulator to adjust the angle;
wherein the step of determining rotation angle information of the moxibustion manipulator based on the plane corresponding to the light spot comprises:
calculating a normal vector of the plane corresponding to the light spot based on the plane corresponding to the light spot; and
determining a rotation angle of the moxibustion manipulator based on the normal vector and a plane corresponding to a flange face of the moxibustion manipulator.

14. The non-transitory computer-readable storage medium of claim 13, wherein the step of determining coordinate information of the moxibustion manipulator based on the acupuncture point position information and safe distance information, and controlling the moxibustion manipulator to move to a position corresponding to the coordinate information comprises:
controlling, based on the acupuncture point position information, the moxibustion manipulator to move towards an acupuncture point corresponding to the acupuncture point position information;
acquiring dynamic distance information between the moxibustion manipulator and the acupuncture point corresponding to the acupuncture point position information;
comparing the dynamic distance information with the safe distance information, wherein the safe distance information is a minimum distance value between the moxibustion manipulator and the acupuncture point corresponding to the acupuncture point position information; and
in response to the dynamic distance information being not greater than the safe distance information, determining the coordinate information of the moxibustion manipulator, and controlling the moxibustion manipulator to stop moving towards the acupuncture point corresponding to the acupuncture point position information.

15. The non-transitory computer-readable storage medium of claim 14, wherein the computer program, when executed by the processor, causes the processor to perform steps of:
before comparing the dynamic distance information with the safe distance information,
receiving an interactive signal sent from a laser sensor, and controlling the moxibustion manipulator to move towards the acupuncture point corresponding to the acupuncture point position information, wherein the laser sensor comprises a pair of laser sensors which are horizontally opposed to each other, and movement of a moxibustion tool head of the moxibustion manipulator to a position between the laser sensors results in blockage of transmission of the interactive signal;
acquiring current z-axis coordinate information of the moxibustion manipulator in response to the interactive signal being not received; and
acquiring z-axis coordinate information of the laser sensor, obtaining a difference between the current z-axis coordinate information of the moxibustion manipulator and the z-axis coordinate information of the laser sensor, and determining the safe distance information.

16. The non-transitory computer-readable storage medium of claim 13, wherein the coordinate information of the light spot comprises two-dimensional coordinate information and z-axis coordinate information, and the computer program, when executed by the processor, causes the processor to perform steps of:
before the step of acquiring coordinate information of a light spot, and determining a plane corresponding to the light spot based on the coordinate information of the light spot,
acquiring two-dimensional coordinate information of the moxibustion manipulator, and determining the two-dimensional coordinate information of the light spot based on a preset difference between the two-dimensional coordinate information of the moxibustion manipulator and the two-dimensional coordinate information of the light spot;
acquiring vertical distance information between the light spot and the moxibustion manipulator; and
acquiring z-axis coordinate information of the moxibustion manipulator, obtaining a difference between the z-axis coordinate information of the moxibustion manipulator and the vertical distance information, and determining the z-axis coordinate information of the light spot.

17. The non-transitory computer-readable storage medium of claim 13, wherein the computer program, when executed by the processor, causes the processor to perform steps of:
before acquiring acupuncture point position information,
acquiring a target area, wherein the target area is a moxibustion execution area; and
adjusting, based on a coordinate system where the target area is located, a coordinate system where the moxibustion manipulator is located; and
after acquiring acupuncture point position information,
determining whether an acupuncture point corresponding to the acupuncture point position information is in the target area;
continuing the method in response to the acupuncture point corresponding to the acupuncture point position information being in the target area; and
stopping the method in response to the acupuncture point corresponding to the acupuncture point position information being not in the target area.

* * * * *